United States Patent [19]

Acker et al.

[11] Patent Number: 5,166,359

[45] Date of Patent: Nov. 24, 1992

[54] AZULENEMETHINE DYES AND AN OPTICAL RECORDING MEDIUM CONTAINING THE NOVEL DYES

[75] Inventors: Michael Acker, Heidelberg; Peter Neumann, Mannheim; Wolfgang Schrott; Matthias Dust, both of Ludwigshafen, all of Fed. Rep. of Germany

[73] Assignee: BASF Aktiengesellschaft, Ludwigshafen, Fed. Rep. of Germany

[21] Appl. No.: 680,037

[22] Filed: Mar. 28, 1991

Related U.S. Application Data

[63] Continuation of Ser. No. 336,347, Apr. 11, 1989, abandoned.

[30] Foreign Application Priority Data

Apr. 21, 1988 [DE] Fed. Rep. of Germany ....... 3813333

[51] Int. Cl.[5] ..................... C09B 23/10; C07D 209/60
[52] U.S. Cl. .................................. 548/436; 544/142;
544/315; 544/316; 544/318; 544/353; 544/354;
544/372; 546/102; 546/104; 546/172; 546/174;
546/175; 546/176; 546/181; 546/200; 548/123
[58] Field of Search ............... 548/436; 544/142, 372;
546/200

[56] References Cited

U.S. PATENT DOCUMENTS

| 4,508,811 | 4/1985 | Gravesteijn et al. | 549/415 X |
| 4,548,886 | 10/1985 | Katagiri et al. | 430/70 |
| 4,565,761 | 1/1986 | Katagiri et al. | 430/83 |
| 4,738,908 | 4/1988 | Oguchi et al. | 430/292 |
| 4,782,006 | 11/1988 | Nishimura et al. | 430/20 |

FOREIGN PATENT DOCUMENTS

| 0264198 | 4/1988 | European Pat. Off. | |
| 1079621 | 4/1960 | Fed. Rep. of Germany | 549/415 X |
| 58-112790 | 7/1983 | Japan | 548/148 |
| 58-112792 | 7/1983 | Japan | 546/79 |
| 58-125246 | 7/1983 | Japan | 546/134 |
| 58-220143 | 12/1983 | Japan | 549/13 |

OTHER PUBLICATIONS

Journal of Organic Chemistry, USSR, vol. 18, (1982), pp. 380-386 Mikhailenko et al.
Thuillier et al, Bull. Soc. Chem. France, 1959 pp. 1397-1401.
Journal of the American Chemical Society, vol. 83, pp. 2933-2937, (1961) Klingsberg.
Tetrahedron Letters No. 46, pp. 4707-4709, (1967) Treibs.
J. Vac. Sci. Technol, 18 (1), pp. 105-109, Jan./Feb. 1981 Jipson et al.

*Primary Examiner*—Mary C. Lee
*Assistant Examiner*—Fiona T. Powers
*Attorney, Agent, or Firm*—Oblon, Spivak, McClelland, Maier & Neustadt

[57] ABSTRACT

An optical recording medium contains novel azulenemethine dyes of the formula

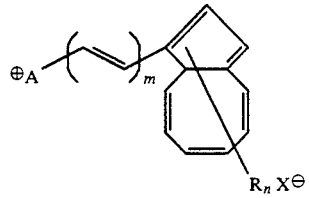

where R is unsubstituted or substituted $C_1$–$C_6$-alkyl, $X^\ominus$ is an anion, $A^\oplus$ is heterocyclic radical, of the formula

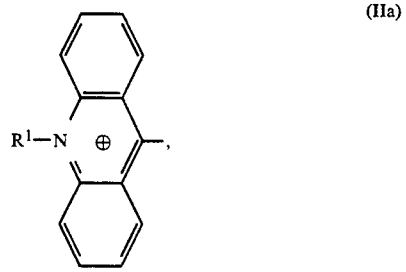
(IIa)

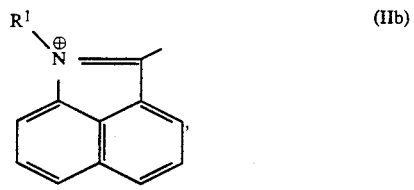

(IIb)

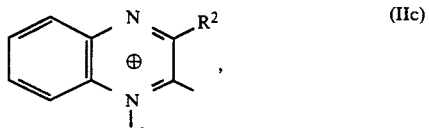

(IIc)

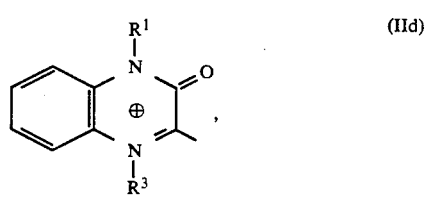

(IId)

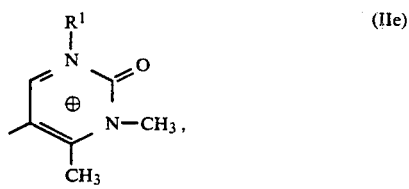

(IIe)

(Abstract continued on next page.)

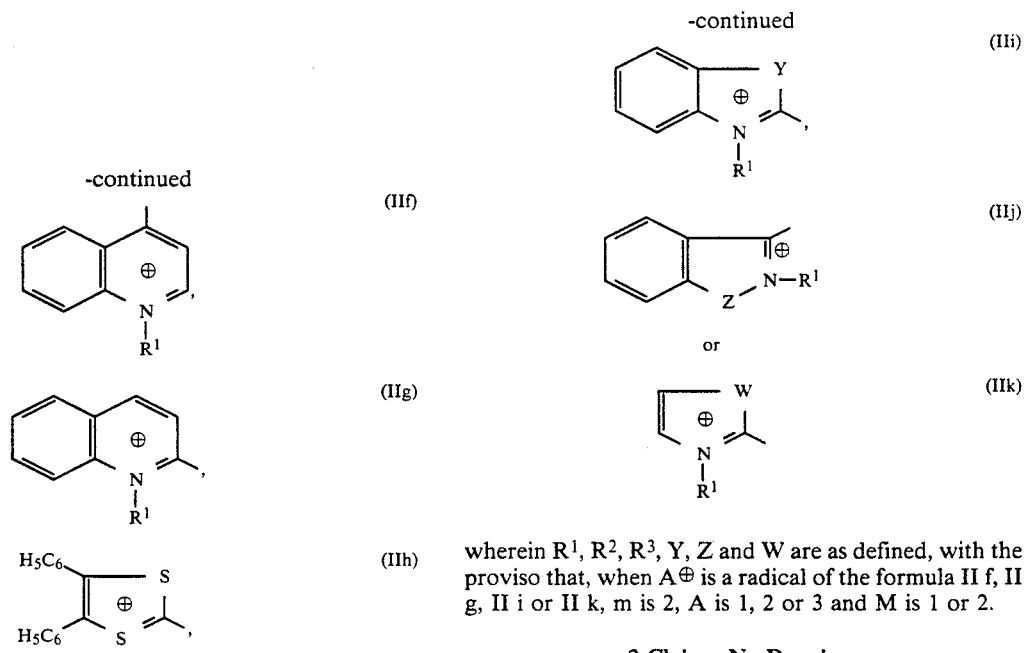
wherein $R^1$, $R^2$, $R^3$, Y, Z and W are as defined, with the proviso that, when $A^\oplus$ is a radical of the formula II f, II g, II i or II k, m is 2, A is 1, 2 or 3 and M is 1 or 2.
3 Claims, No Drawings

AZULENEMETHINE DYES AND AN OPTICAL RECORDING MEDIUM CONTAINING THE NOVEL DYES

This application is a continuation of application Ser. No. 07/336,347, filed on Apr. 11, 1989, now abandoned.

The present invention relates to azulenemethine dyes of the formula I

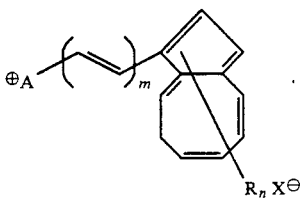
(I)

where R is $C_1$–$C_6$-alkyl which is unsubstituted or substituted by halogen, cyano, amino or $C_1$–$C_6$-alkoxy, $X^\ominus$ is an anion, $A^\oplus$ is a heterocyclic radical of the formula

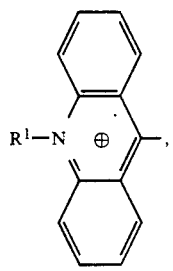
(IIa)

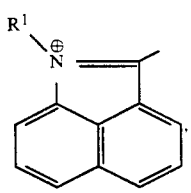
(IIb)

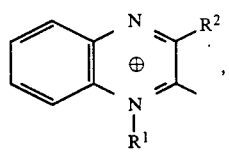
(IIc)

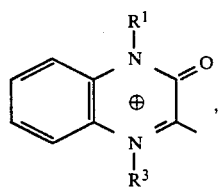
(IId)

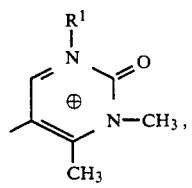
(IIe)

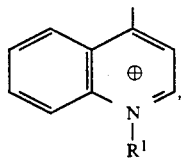
(IIf)

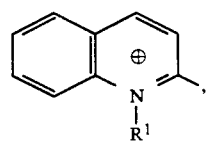
(IIg)

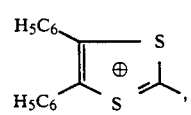
(IIh)

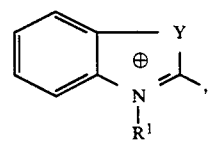
(IIi)

(IIj)

or (IIk)

$R^1$ is $C_1$–$C_{22}$-alkyl which is unsubstituted or substituted and/or interrupted by one or more oxygen atoms or is unsubstituted or substituted $C_5$–$C_7$-cycloalkyl, $R^2$ is hydrogen, $C_1$–$C_4$-alkyl or cyano, $R^3$ is $C_1$–$C_4$-alkyl, Y is nitrogen, oxygen, sulfur, selenium or $(CH_3)_2C$, Z is sulfur or selenium and W is nitrogen, sulfur, selenium or —CH=CH— and the heterocyclic radical $A^\oplus$ may be further substituted and/or benzofused, n is 1, 2 or 3 and m is 1 or 2, with the proviso that, when $A^\oplus$ is a radical of the formula II f, II g, II i or II k, m is 2.

The present invention furthermore relates to an optical recording medium containing a substrate and a dye-containing layer which is sensitive to laser light, wherein the dye is an azulenemethine dye of the formula I.

Recording media which undergo a localized change of state when exposed to radiation of high energy density, for example laser light, are known. This thermally initiated change of state, for example vaporization, change in flow behavior or fading, is associated with a change in the optical properties, for example of the absorption as a result of a change in the absorption maximum or in the extinction, which can be utilized for information or data recording.

A suitable light source for an optical recording medium is, for example, a semiconductor laser which emits light in the near infrared range. Solid-state injection lasers, especially the AlGaAs laser, which operates in a wavelength range from about 650 to 900 nm, may be mentioned in particular here. There is therefore particular interest in recording materials which absorb radiation in the wavelength range from about 650 to 900 nm and can be processed to give thin, homogeneous layers.

Thus, JP-A-112 790/1983 and JP-A-125 246/1983 state that methine dyes are used for this purpose.

Squaric acid dyes, which serve as optical storage material, are disclosed in, for example, EP-A-116 381, JP-A-112 792/1983 or JP-A-220 143/1983. DE-A-3 320 674 describes, inter alia, asymmetric methine dyes having azulene radicals and benzoxazole, quinoline, benzothiazole, pyridine, lepidine, 3,3-dimethylindolenine or benzimidazole groups as storage material.

It is an object of the present invention to provide novel radiation-sensitive products which have good reflectance and high absorption in the wavelength range of the semiconductor lasers used. They should furthermore be obtainable in a simple manner, be stable over a long period and be readily soluble in polymers. It is a further object of the present invention to provide a novel optical recording medium in which the layers containing the novel products should be homogeneous, have good adhesion to the conventional substrates and be stable over a long period. Moreover, these recording media should permit data recording by means of a semiconductor laser and should be subsequently capable of being read easily, and should exhibit a very high signal/noise ratio.

We have found that these objects are achieved by the azulenemethine dyes defined at the outset and of the formula I, and by an optical recording medium containing a substrate and a layer which is sensitive to laser light and contains an azulenemethine dye of the formula I.

All alkyl groups occurring in the abovementioned radicals of the formula I may be either linear or branched.

Examples of suitable radicals R are methyl, ethyl, propyl, isopropyl, butyl, isobutyl, sec-butyl, tert-butyl, pentyl, isopentyl, neopentyl, tert-pentyl, hexyl, 2-methylpentyl, fluoromethyl, chloromethyl, difluoromethyl, trifluoromethyl, trichloromethyl, 2-fluoroethyl, 2-chloroethyl, 2-bromoethyl, 1,1-difluoroethyl, heptafluoropropyl, 4-chlorobutyl, 5-fluoropentyl, 6-chlorohexyl, cyanomethyl, 2-cyanoethyl, 3-cyanopropyl, 4-cyanobutyl, 5-cyanopentyl, 6-cyanohexyl, 2-aminoethyl, 2-aminopropyl, 3-aminopropyl, 2-aminobutyl, 4-aminobutyl, 5-aminopentyl, 6-aminohexyl, 2-methoxyethyl, 2-ethoxyethyl, 2-propoxyethyl, 2-isopropoxyethyl, 2-butoxyethyl, 2- and 3-methoxypropyl, 2- and 3-ethoxypropyl, 2- and 4-ethoxybutyl, 2- and 4-isopropoxybutyl, 5-ethoxypentyl and 6-methoxyhexyl.

$X^\ominus$ in formula I is an anion. Suitable anions are inorganic and organic anions, for example halide, such as chloride, bromide or iodide, sulfate, perchlorate, phosphate, tetrafluoborate, trichlorozincate, methylsulfonate, phenylsulfonate, 4-methylphenylsulfonate, acetate, lactate, salicylate and tetraphenylboranate. The invention also embraces dyes of the formula I which have the betaine structure, i.e. those in which the anionic group is part of the dye molecule.

$X^\ominus$ may furthermore be, for example, an anion of a heteropoly acid based on tungsten and/or molybdenum with phosphorus, silicon, vanadium, cobalt, aluminum, manganese, chromium and/or nickel. Another suitable anion is, for example, the copper(I) hexacyanoferrate(II) anion.

The preparation of the heteropoly acids or of the salts of these acids is known. The acids are obtained by acidification of solutions of the tungstates, molybdates and/or vanadates in the form of the alkali metal and/or ammonium salts in the presence of phosphate and/or water-soluble silicates. By suitably choosing the molar ratio or weight ratio of tungstate, molybdate, vanadate, phosphate and silicic acid or its salts, various heteropoly acids can be synthesized.

Examples of heteropoly acids are phosphomolybdic acid, silicomolybdic acid, phosphotungstic acid, silicotungstic acid, phosphovanadic acid, silicovanadic acid, phosphotungstomolybdic acid, silicotungstomolybdic acid, phospho- and silicotungstovanadic acid and phosphosilicotungstomolybdic acid, which may also contain vanadium.

If $R^1$ is substituted $C_1$–$C_{22}$-alkyl, examples of suitable substituents are hydroxyl, methacryloyloxy, phenyl, halogen, carboxyl, hydroxysulfonyl, $C_1$–$C_4$-alkanoyl, $C_1$–$C_4$-alkanoylamino, $C_1$–$C_4$-alkoxycarbonyl or $C_1$–$C_4$-alkoxycarbonylamino. The alkyl chain may furthermore be interrupted by one or more, in particular from 1 to 3, oxygen atoms.

If the heterocyclic radicals II a–II k are further substituted, examples of suitable substituents are $C_1$–$C_{12}$-alkyl, which may be interrupted by one or more, in particular 1 to 3, oxygen atoms, and phenyl, hydroxyl, halogen, in particular chlorine or bromine, $C_1$–$C_{22}$-alkoxy, $C_1$–$C_{10}$-alkylthio, phenylthio, cyano, amino, $C_1$–$C_{16}$-mono- or dialkylamino, pyrrolidino, piperidino, morpholino, piperazino, N-($C_1$–$C_4$-alkyl)-piperazino or hydroxysulfonyl.

If $R^1$ is substituted $C_5$–$C_7$-cycloalkyl, examples of suitable substituents are $C_1$–$C_4$-alkyl or halogen, in particular chlorine or bromine.

Specific examples of $R^1$ are methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl, eicosyl, heneicosyl, docosyl (the names isooctyl, isononyl, isodecyl and isotridecyl are trivial names and originate from the alcohols obtained in the oxo synthesis [cf. Ullmanns Enzyklopädie der technischen Chemie, 4th Edition, Volume 7, pages 215–217, and Volume 11, pages 435 and 436]), benzyl, 1- or 2-phenylethyl, trifluoromethyl, trichloromethyl, bromomethyl, 2-bromomethyl, 1,1,1-trifluoroethyl, heptafluoropropyl, 4-bromobutyl, 2-methoxyethoxy, 2-ethoxyethyl, 2-propoxyethyl, 2butoxyethyl, 2-benzyloxyethyl, 2-ethoxypropyl, 3-ethoxypropyl, 3-benzyloxypropyl, 3,6-dioxaheptyl, 3,6-dioxaoctyl, 3,6-dioxadecyl, 3,6,9-trioxadecyl, 4-oxa-6-ethyldecyl, 3,6-dioxy-7-phenylheptyl, propan-2-on-1-yl, butan-3-on-1-yl, butan-3-on-2-yl, 2-ethylpentan-3-on-1-yl, carboxymethyl, 2-carboxymethyl, 3-carboxypropyl, 4-carboxybutyl, 5-carboxypentyl, 4-carboxy-3-oxabutyl, acetylaminomethyl, 2-(acetylamino)ethyl, 2-(propionylamino)ethyl, 2-(butyrylamino)ethyl, ethoxycarbonylmethyl, 2-(ethoxycarbonyl)ethyl, 2- or 3-(methoxycarbonyl) propyl, ethoxycarbonylaminomethyl, 2-(ethoxycarbonylamino)ethyl, 2-hydroxyethyl, 2-hydroxypropyl, 3hydroxypropyl, 2-hydroxybutyl, 4-hydroxybutyl, 5-hydroxypentyl, 6-hydroxyhexyl, 7-hydroxyheptyl, 8-hydroxyoctyl, 2-methacryloyloxyethyl, 2- or 3-methacryloyloxypropyl, 2- or 4-methacryloyloxybutyl, 2-hydroxysulfonylethyl, 2- or 3-hydroxysulfonylpropyl, 2- or 4-hydroxysulfonylbutyl, cyclopentyl, cyclohexyl, cycloheptyl, 3-methylcyclopentyl, 4-methylcyclohexyl, 4-ethylcyclohexyl or 2,3-dichlorocyclohexyl.

Preferred azulenemethine dyes of the formula I are those in which R is $C_1$–$C_3$-alkyl, $R^1$ is $C_1$–$C_{22}$-alkyl which may be interrupted by 1 to 3 oxygen atoms, or is $C_1$–$C_{22}$-bromoalkyl, $C_1$–$C_{12}$-hydroxyalkyl, $C_1$–$C_{12}$-methacryloyloxyalkyl, $C_1$–$C_{12}$-hydroxysulfonylalkyl, $C_1$–$C_6$-carboxyalkyl or ($C_1$–$C_4$-alkoxycarbonyl)-$C_1$–$C_6$-alkyl, m is 1 or 2 and n is 3.

Other preferred azulenemethine dyes of the formula I are those in which $A^{\oplus}$ is a heterocyclic radical of the formula II a, II b, II c, II d, II f, II g or II h, each of which is unsubstituted or substituted by amino or hydroxysulfonyl or, in particular, by chlorine, bromine or phenylthio.

If the radical $A^{\oplus}$ is of the formula II c, preferred dyes of the formula I are those in which A is

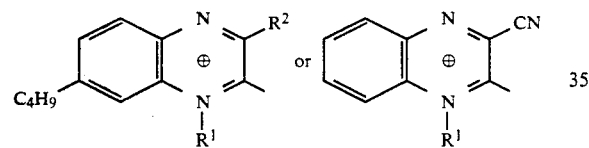

and $R^1$ and $R^2$ have the abovementioned meanings.

Azulenemethine dyes of the formula I a or I b

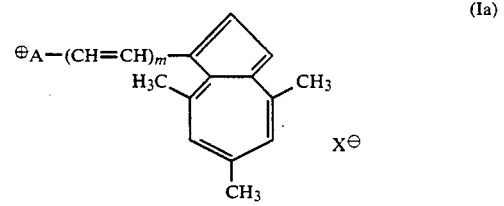
(Ia)

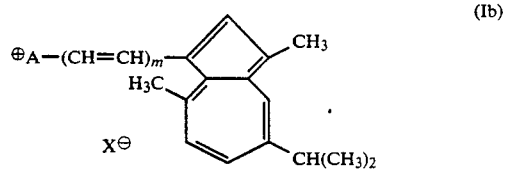
(Ib)

where $A^{\oplus}$, m and $X^{\ominus}$ have the abovementioned meanings, are particularly preferred.

Preferred anions $X^{\ominus}$ are chloride, bromide, iodide, perchlorate, tetrafluoborate, 4-methylphenylsulfonate, methylsulfonate and tetraphenylboranate.

The novel dyes of the formula I can be prepared, for example, by condensation of cyclammonium compounds of the formula

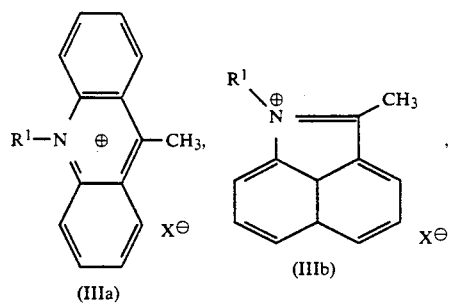
(IIIa)    (IIIb)

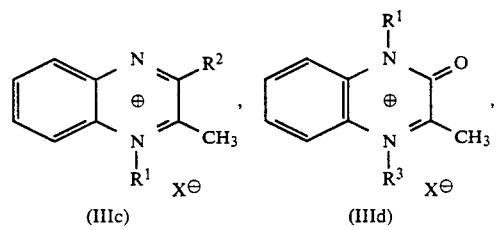
(IIIc)    (IIId)

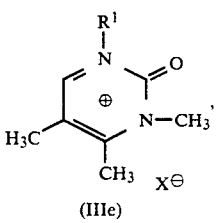
(IIIe)

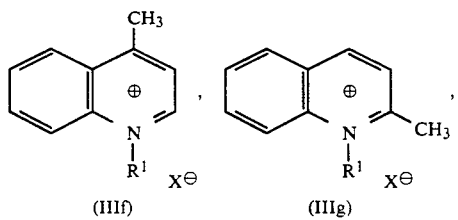
(IIIf)    (IIIg)

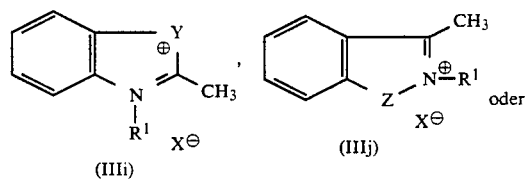
(IIIi)    (IIIj)  oder

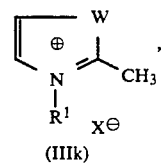
(IIIk)

where $R^1$, $R^2$, $R^3$, W, Y, Z and $A^{\ominus}$ have the abovementioned meanings, or of compounds of the formula

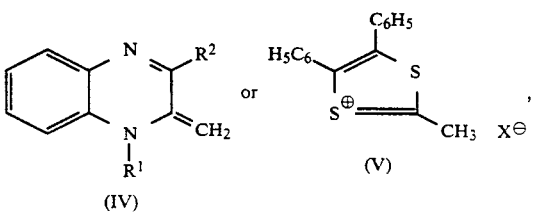
(IV)    (V)

where $R^1$, $R^2$ and $X^\ominus$ have the abovementioned meanings, with an aldehyde of the formula

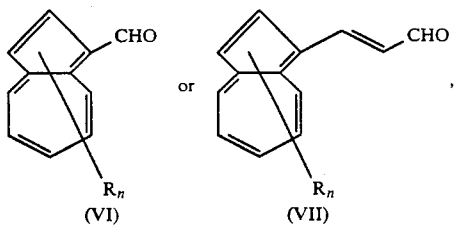

where R and n have the abovementioned meanings, in an inert solvent, if necessary with catalysis by a base, at from 20° to 140° C., or in the absence of a solvent, by fusing the abovementioned components, with the exception of the aldehyde VI, at from 60° to 100° C. In the preparation of the azulenemethine dyes of the formula I, where A is a radical II c, it is advantageous to start from the neutral enamines of the formula IV which are prepared in situ.

Examples of suitable solvents for the reactions are methanol, ethanol, butanol, acetic anhydride, pyridine, glacial acetic acid and compatible mixtures thereof.

Examples of suitable bases are triethylamine, tributylamine, N-methylpiperidine and N,N-dimethylaniline.

The cycloammonium compounds III a–III e required as starting materials and the compounds IV and V are known and are described in, for example, J. Org. Chem. USSR 18 (1982), 380; A. Weissberger and E. C. Taylor, Chemistry of Heterocyclic Compounds, Volume 9, 1973, and Volume 35, 1979, Interscience Publishers; Bull. Soc. Chim. Fr. 1959, page 1398 or J. Am. Chem. Soc. 83 (1961), 2934, or can be prepared by the methods described there.

The aldehydes VI and VII are likewise known or can be synthesized by a conventional method (aldehyde VI: Houben-Weyl, Methoden der Organischen Chemie, Volume 5, Part 2 c, Thieme Verlag Stuttgart, New York, 1985, 4th Edition, page 266 et seq.; Tetrahedron Lett. 1967, page 4707; Aldehyde VII: DE-B-1 079 629).

The novel azulenemethine dyes of the formula I have a high molar absorption in the range from 650 to 850 nm. They are readily soluble in organic solvents and/or thermoplastics or crosslinked plastics.

The present invention furthermore relates to an optical recording medium containing a substrate and a dye-containing layer which is sensitive to laser light, the dye being of the formula I.

The structure of the recording media is known per se (cf. for example J. Vac. Sci. Technol. 18 (1), January/February 1981, page 105).

Examples of suitable substrates are glass plates or disks or plastic plates or disks, in particular plates or disks of polymethyl methacrylate, polystyrene, polystyrene copolymers, polyvinyl chloride, polymethylpentene or polycarbonate, which may have tracks.

The substrate may be in the form of a tape, a square or rectangular plate or, preferably, a circular disk, the disks conventionally used for laser-optical recording materials and having a diameter of from 10 to 13 cm being preferred.

The novel recording medium may be free of binders. However, the recording medium preferaby contains a binder. Examples of suitable binders are silicone resins, epoxy resins, acrylate resins, polystyrene homopolymers and copolymers, polyvinylcarbazole, polyvinylpyrrolidone, polyvinyl ester copolymers, polyvinylidene chloride copolymers and polyvinyl chloride.

A reflective layer may be present between the light-absorbing layer and the substrate, so that that part of the incident light passing through the colored layer which is not absorbed is reflected at the reflector layer and passes again through the colored layer.

Exposure can also be effected through a transparent substrate. A suitable layer sequence in this case is the arrangement substrate—absorber layer—any reflector layer.

Examples of suitable light-reflecting materials are aluminum, rhodium, gold, tin, lead, bismuth, copper or dielectric mirrors. The light-reflecting layer should be sufficiently thick to reflect as completely as possible the light used for recording or for scanning.

Mirrors having low thermal conductivity are advantageous for this purpose. The substrate or the light-reflecting layer must have an optically smooth, even surface and its surface must be such that the absorbing layer firmly adheres thereon. In order advantageously to affect the surface quality and adhesion phenomena, the substrate and/or the reflector can be provided with a subbing layer consisting of a thermosetting plastic or thermoplastic material.

Where the optical recording medium has a metallic reflector, the metallic reflector layer is preferably applied by a known method, for example by vapor deposition under reduced pressure or by applying a suitable metal foil to the substrate.

The novel recording medium is applied to a substrate by spin-coating with a solution containing a dye of the formula I, if necessary a polymeric binder and a solvent, and the layer is dried in the air. The film can also be dried under reduced pressure, at elevated temperatures or, if necessary, by exposure to radiation.

Examples of suitable solvents are 1,1,2-trichloroethane, methyl ethyl ketone, diacetone alcohol, toluene, methanol, ethanol, propanol or a mixture of these.

If necessary, the solution to be applied by spin-coating may contain additives, such as antioxidants, singulet oxygen quenchers or UV absorbers.

It is also possible to apply a protective layer to the dye-in-polymer layer. A number of polymers are suitable for this purpose and a protective layer can be obtained by applying dissolved polymers by spin-coating, knife-coating or immersion or by vapor deposition of, in particular, fluorinated polymers under reduced pressure.

If the recording system is produced from two identical or different recording media in the form of a sandwich, a protective layer can generally be dispensed with. In addition to greater mechanical and rotational-dynamic stability, the sandwich structure has the advantage of possessing twice the storage capacity.

If the optical recording medium is of sufficient quality, the protective and/or intermediate layer can usually be dispensed with. If, however, it is impossible to dispense with intermediate layers, its thickness must be chosen so that no interference can occur, the refractive index of the material used for this purpose and the laser light wavelength used being taken into account.

At the wavelength of the commercially available semiconductor lasers (about 650–900 nm), the novel optical recording medium has high absorption. The dye-in-polymer systems can be applied to a light-reflecting layer to give smooth, homogeneous absorption layers of high optical quality, which have an advantageous threshold energy and in which the information to be stored can be recorded in the form of pits, resulting in an excellent signal/noise ratio.

The recording media according to the present invention can be recorded on and read by means of a semiconductor laser. Recording media according to the invention are very stable to atmospheric influences and daylight.

Because of the high light absorption of the azulenemethine dyes of the formula I, the novel recording media are very sensitive to the light of solid state injection lasers emitting in the near infrared range. A particular example of these is the AlGaAs laser, which operates in the wavelength range from 750 to 950 nm. Because of the small size of the component, its low energy requirement and the possibility of direct modulation of the optical output power by modulating the electric drive current, such types of lasers are particularly suitable.

The Examples which follow illustrate the invention.

A) PREPARATION OF THE DYES

Example 1

9.6 g (22 mmol) of 9-methyl-10-(3, 6-dioxaoctyl)-acridinium iodide were dissolved in 200 ml of acetic anhydride, 5.0 g (22 mmol) of guajazulene-1-aldehyde were added and the stirred mixture was then heated for 4 hours at 80° C. After cooling, the reaction solution was poured into 1 l of diethyl ether and the mixture was filtered under suction. The dye thus obtained was washed several times with diethyl ether and then dried under reduced pressure. A dye of the formula was obtained.

Yield: 13.2 g (92% of theory); mp.: 140° C. (decomposition); λmax 740 nm (in $CH_2Cl_2$).

Example 2

0.9 g (2 mmol) of 9-methyl-10-(2-hydroxyoctyl)acridinium iodide were dissolved in 20 ml of ethanol, 0.45 g (2 mmol) of guajazulene-1-aldehyde and 0.2 g (2 mmol) of triethylamine were added and the stirred mixture was then heated for 4 hours at 80° C. After cooling, the reaction solution was poured into 1 l of diethyl ether and the mixture was filtered under suction. The dye thus obtained was washed several times with diethyl ether and then dried under reduced pressure.

A dye of the formula

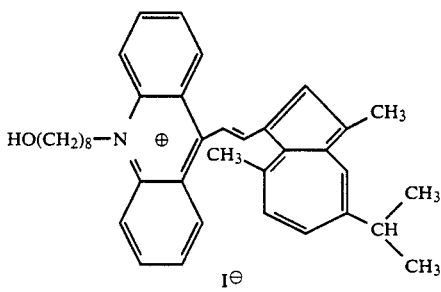

was obtained.

Yield: 0.7 g (54% of theory); λmax 742 nm (in $CH_2Cl_2$).

The dyes listed in the Table below were prepared similarly to Example 1 or 2. The solvent used in the determination of the absorption maximum λmax is also stated.

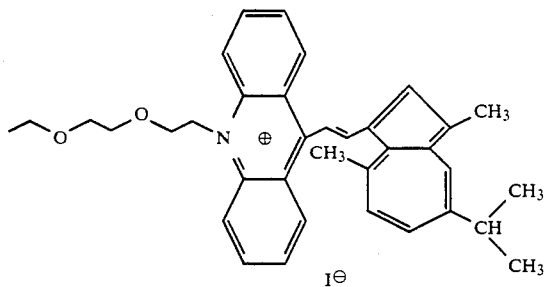

| Example | Dye | λmax [nm] | Solvent |
| --- | --- | --- | --- |
| 3 | | 742 | $CH_2Cl_2$ |

| Example | Dye | λmax [nm] | Solvent |
|---|---|---|---|
| 4 | (structure: methacrylate-O-(CH₂)₆-N⁺ quinolinium-azulenyl dye, I⁻) | 742 | CH₂Cl₂ |
| 5 | (structure: methacrylate-O-(CH₂)₈-N⁺ quinolinium-azulenyl dye, I⁻) | 742 | CH₂Cl₂ |
| 6 | (structure: CH₃C(O)O-(CH₂)₁₁-N⁺ quinolinium-azulenyl dye, I⁻) | 742 | CH₂Cl₂ |
| 7 | (structure: ethoxyethoxyethyl-N⁺ chloroquinolinium-azulenyl dye, I⁻) | 742 | CH₂Cl₂ |
| 8 | (structure: ethoxyethoxyethyl-N⁺ aminoquinolinium-azulenyl dye, I⁻) | 747 | CH₂Cl₂ |

-continued

| Example | Dye | λmax [nm] | Solvent |
|---|---|---|---|
| 9 | | 847 | CH₂Cl₂ |
| 10 | | 815 | CH₂Cl₂ |
| 11 | | 711 | C₂H₅OH |
| 12 | | 737 | CH₂Cl₂ |
| 13 | | 772 | CH₂Cl₂ |
| 14 | | 776 | CH₂Cl₂ |

-continued

| Example | Dye | λmax [nm] | Solvent |
|---|---|---|---|
| 15 | (structure with bromo-naphthalene, azulene, isopropyl) | 735 | CH₂Cl₂ |
| 16 | (structure with dibromo-naphthalene, azulene, isopropyl) | 740 | CH₂Cl₂ |
| 17 | (structure with naphthalene, extended polyene, azulene, isopropyl) | 811 | CH₂Cl₂ |
| 18 | (structure with naphthalene, azulene, dimethyl) | 794 | CH₃Cl₂ |
| 19 | (structure with acetoxy-alkyl chain, naphthalene, azulene, dimethyl) | 794 | CH₂Cl₂ |
| 20 | (structure with diaminobenzene, azulene, isopropyl) | 672 | CH₂Cl₂ |

-continued

| Example | Dye | λmax [nm] | Solvent |
|---|---|---|---|
| 21 | (structure) | 663 | CH₂Cl₂ |
| 22 | (structure) | 646 | CH₂Cl₂ |
| 23 | (structure) | 658 | CH₂Cl₂ |
| 24 | (structure) | 744 | CH₂Cl₂ |
| 25 | (structure) | 608 | CH₂Cl₂ |

-continued

| Example | Dye | λmax [nm] | Solvent |
|---|---|---|---|
| 26 | 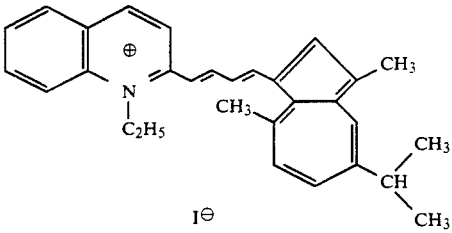 | 695 | CH$_2$Cl$_2$ |
| 27 | 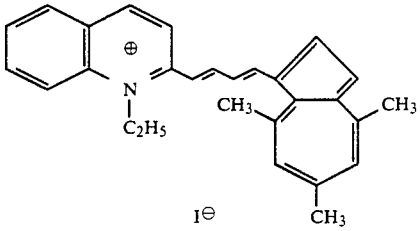 | 640 | CH$_2$Cl$_2$ |
| 28 | 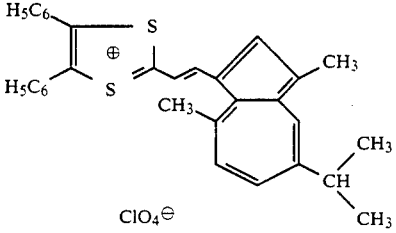 | 682 | CH$_2$Cl$_2$ |
| 29 | 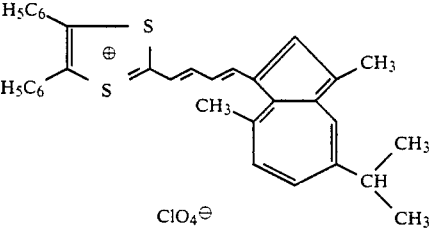 | 721 | CH$_2$Cl$_2$ |
| 30 | 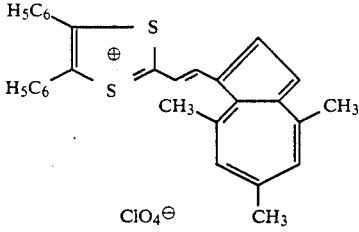 | 622 | CH$_2$Cl$_2$ |
| 31 | 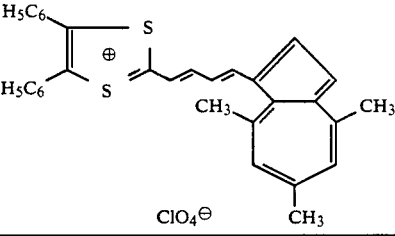 | 654 | CH$_2$Cl$_2$ |

B) PRODUCTION OF THE OPTICAL RECORDING MEDIUM 0.219 g of a copolymer of methyl methacrylate and methacrylic acid (70:30) was dissolved in 2.99 g of diacetone alcohol and 3.15 g of acetone, and 0.1365 g of dye No. 1 was added. The mixture was stirred for 1 hour at room temperature, after which it was filtered and the solution was applied to a polymethyl methacrylate substrate by spin-coating at 1,800 rpm.

The layer thus obtained was homogeneous and without defects. The layer thickness was 116 nm and the layer had a broad absorption band. At 830 nm, the extinction was 0.18.

Individual pits about 1 μm in size were recorded in the active layer by means of an AlGaAs laser (λ=820 nm) mounted on a turntable. The sensitivity of the layer was better than 1 nJ/pit. When reading the pits, an excellent signal/noise ratio was obtained.

We claim:

1. An azulenemethine dye of the formula I

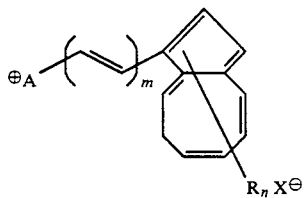
(I)

where R is $C_1$–$C_6$-alkyl which is unsubstituted or substituted by halogen, cyano, amino or $C_1$–$C_6$-alkoxy, $X^\ominus$ is an anion, $A^\oplus$ is a heterocyclic radical of the formula

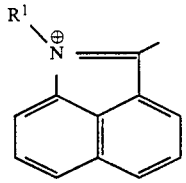
(IIb)

$R^1$ is $C_1$–$C_{22}$-alkyl; $C_1$–$C_{22}$-alkyl substituted by substituent selected from hydroxyl, methacryloxy, phenyl, halogen, carboxyl, hydroxysulfonyl, $C_1$–$C_4$-alkanoylamino, $C_1$–$C_4$-alkoxycarbonyl, $C_1$–$C_4$-alkoxycarbonylamino, $C_1$–$C_{22}$-alkoxy, $C_1$–$C_{10}$-alkylthio, phenylthio, cyano, amino, $C_1$–$C_{16}$-mono-or di-alkylamino, pyrrolidino, piperidino, morpholino, piperazino or N-$C_1$–$C_4$-alkyl-piperazino; $C_1$–$C_{22}$alkyl interrupted by one or more oxygen atoms; or $C_1$–$C_{22}$alkyl substituted by said substituents and interrupted by one or more oxygen atoms; or is $C_5$–$C_7$-cycloalkyl or $C_5$–$C_7$-cycloalkyl substituted by $C_1$–$C_4$alkyl or halogen; and the heterocyclic radical $A^\oplus$ may be further benzofused; n is 1, 2 or 3 and m is 1 or 2.

2. An azulenemethine dye as claimed in claim 1, wherein R is $C_1$–$C_3$-alkyl, $R^1$ is $C_1$–$C_{22}$-alkyl or $C_1$–$C_{22}$-alkyl interrupted by 1 to 3 oxygen atoms, or is $C_1$–$C_{22}$-bromoalkyl, $C_1$–$C_{12}$-hydroxyalkyl, $C_1$–$C_{12}$-methacryloxyloxyalkyl, $C_1$–$C_{12}$-hydroxysulfonylalkyl, $C_1$–$C_6$-carboxyalkyl or ($C_1$–$C_4$-alkoxycarbonyl)-$C_1$–$C_6$-alkyl, m is 1 or 2 and n is 3.

3. An azulenemethine dye as claimed in claim 1, of the formula:

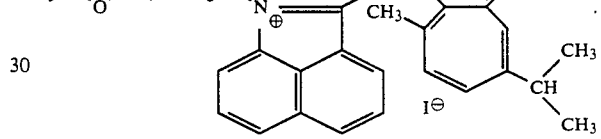

* * * * *